United States Patent
Lacal Bereslawski et al.

(10) Patent No.: US 11,983,201 B2
(45) Date of Patent: May 14, 2024

(54) CREATING A METATYPE TREE FOR METATYPE INTROSPECTION

(71) Applicant: International Business Machines Corporation, Armonk, NY (US)

(72) Inventors: Enrique Lacal Bereslawski, Winchester (GB); Ian Partridge, Eastleigh (GB); Christopher Neil Bailey, Southampton (GB); Neil Hardman, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 16/585,102

(22) Filed: Sep. 27, 2019

(65) Prior Publication Data
US 2021/0097090 A1    Apr. 1, 2021

(51) Int. Cl.
*G06F 17/00*    (2019.01)
*G06F 16/22*    (2019.01)
*G06F 16/28*    (2019.01)

(52) U.S. Cl.
CPC ........ *G06F 16/285* (2019.01); *G06F 16/2246* (2019.01)

(58) Field of Classification Search
CPC .. G06F 16/22; G06F 16/2228; G06F 16/2246; G06F 16/2291; G06F 16/285; G06F 8/315; G06F 8/437
See application file for complete search history.

(56) References Cited

U.S. PATENT DOCUMENTS

| | | | | |
|---|---|---|---|---|
| 5,701,467 A | * | 12/1997 | Freeston | G06F 16/2246 707/741 |
| 6,081,212 A | * | 6/2000 | Tagato | H04L 29/06 341/79 |
| 7,827,219 B2 | * | 11/2010 | Chowdhury | G06F 16/9027 707/899 |
| 8,051,105 B1 | * | 11/2011 | Johnson | G06F 16/2246 707/798 |
| 9,971,575 B1 | | 5/2018 | Wang | |
| 10,171,311 B2 | * | 1/2019 | Harvey | G06F 16/21 |
| 11,500,841 B2 | * | 11/2022 | Fokoue-Nkoutche | G06N 5/013 |
| 2006/0053128 A1 | * | 3/2006 | Gestrelius | G06F 16/835 |
| 2009/0024986 A1 | | 1/2009 | Meijer et al. | |

(Continued)

OTHER PUBLICATIONS

J. Protze, T. Hilbrich, A. Knüpfer, B. R. de Supinski and M. S. Müller, "Holistic Debugging of MPI Derived Datatypes," 2012 IEEE 26th International Parallel and Distributed Processing Symposium, Shanghai, China, 2012, pp. 354-365, doi: 10.1109/IPDPS.2012.41, May 2012.*

J. Protze, T. Hilbrich, A. Knüpfer, B. R. de Supinski and M. S. Müller, "Holistic Debugging of MPI Derived Datatypes," 2012 IEEE 26th International Parallel and Distributed Processing Symposium, pp. 354-365, doi: 10.1109/IPDPS.2012.41. May 2012.*

(Continued)

*Primary Examiner* — Greta L Robinson
(74) *Attorney, Agent, or Firm* — Nathan M. Rau (57) ABSTRACT

Concepts for creating a metatype tree for metatype introspection are presented. One example comprises decoding a parent metatype from a synthetic dataset by decoding one or more child metatypes of the parent metatype. The method then comprises creating a metatype tree comprising a parent node and one or more child nodes of the parent node. The parent node comprises the decoded parent metatype and the one or more child nodes of the parent node comprise the one or more decoded child metatypes.

20 Claims, 5 Drawing Sheets

(56) References Cited

U.S. PATENT DOCUMENTS

| | | |
|---|---|---|
| 2011/0231816 A1 | 9/2011 | Zvibel |
| 2013/0031137 A1* | 1/2013 | Chen .................... G06F 16/283 707/797 |
| 2016/0259633 A1 | 9/2016 | Poon |
| 2016/0359878 A1* | 12/2016 | Prasad ................ H04L 43/0811 |
| 2017/0139966 A1* | 5/2017 | Azoulay ........... G06F 16/24566 |
| 2018/0218055 A1* | 8/2018 | Franz .................... G06F 16/245 |
| 2019/0324953 A1* | 10/2019 | Hedberg ............ G06F 16/2246 |
| 2020/0175181 A1* | 6/2020 | Hughes ............. G06F 16/24573 |
| 2020/0211110 A1* | 7/2020 | Muthuswamy Sivaraman ........... G06F 16/2246 |
| 2020/0257824 A1* | 8/2020 | Okada ................... G06F 16/285 |

OTHER PUBLICATIONS

P. Azalov and F. Zlatarova, "SDG—a system for synthetic data generation," Proceedings ITCC 2003. International Conference on Information Technology: Coding and Computing, pp. 69-75, Apr. 2003.*

Djones6, "IBM-Swift / TypeDecoder," Github, https://github.com/IBM-Swift/TypeDecoder, printed Aug. 8, 2019, 6 pgs, publicly available Nov. 4, 2018, Grace Period Disclosure.

Vadimeisenbergibm, "IBM-Swift/Kitura," Github, https://github.com/IBM-Swift/Kitura, printed Aug. 8, 2019, 3 pgs, publicly available Nov. 4, 2018, Grace Period Disclosure.

* cited by examiner

CREATING A METATYPE TREE FOR METATYPE INTROSPECTION

STATEMENT REGARDING PRIOR DISCLOSURES BY THE INVENTOR OR A JOINT INVENTOR

The following disclosure(s) are submitted under 35 U.S.C. 102(b)(1)(A):

DJONES6, "IBM-Swift/TypeDecoder," Github, https://github.com/IBM-Swift/TypeDecoder, printed Aug. 8, 2019, 6 pgs, publicly available Nov. 4, 2018.

VADIMEISENBERGIBM, "IBM-Swift/Kitura," Github, https://github.com/IBM-Swift/Kitura, printed Aug. 8, 2019, 3 pgs, publicly available Nov. 4, 2018.

BACKGROUND

The present disclosure relates generally to metatype introspection, and more specifically to creating a metatype tree for metatype introspection.

Many traditional programming languages possess a capability of reflection. Examples of such programming languages include Java® and Ruby. Reflection is the ability of a program or process to examine, introspect, and modify objects at runtime, enabling the modification of the structure and behavior of the program or process. Introspection, or type introspection, is the ability of a program to examine a type or properties of an object at runtime. A type is an attribute of an object which tells the program compiler how the programmer intends to use the object. Most traditional programming languages support common data types such as real, integer, and Boolean types. A type constrains the values that an expression, such as a variable or a function, may take. As such, a type defines the operations that can be done on an object corresponding to the type, the meaning of the object, and the way values of that type can be stored.

In this way, introspection enables a program to determine the type information for an object and any of its subordinate objects. Consequently, reflection goes a step further than introspection and enables a program to manipulate the values, meta-data, properties, and/or functions of an object at runtime. Both introspection and reflection can only be directly used on an instance of a type and not on a type of a type, i.e., a metatype.

SUMMARY

According to some embodiments of the present disclosure, there is provided a computer-implemented method for creating a metatype tree for metatype introspection. The method comprises decoding a parent metatype from a synthetic dataset by decoding one or more child metatypes of the parent metatype. The method then comprises creating a metatype tree comprising a parent node and one or more child nodes of the parent node. The parent node comprises the decoded parent metatype and the one or more child nodes of the parent node comprises the one or more decoded child metatypes.

According to some embodiments of the disclosure, there is provided a system for creating a metatype tree for metatype introspection. The system comprises one or more processors; and a memory communicatively coupled to the one or more processors wherein the memory comprises instructions which, when executed by the one or more processors, cause the one or more processors to perform a method. The method comprises decoding a parent metatype from a synthetic dataset by decoding one or more child metatypes of the parent metatype. The method then comprises creating a metatype tree comprising a parent node and one or more child nodes of the parent node. The parent node comprises the decoded parent metatype and the one or more child nodes of the parent node comprises the one or more decoded child metatypes.

According to some embodiments of the disclosure, there is provided a computer program product for creating a metatype tree for metatype introspection. The computer program product comprises a computer readable storage medium having program instructions embodied therewith, the program instructions executable by a processing unit to cause the processing unit to perform a method according to a proposed embodiment.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

It should be understood that the Figures are merely schematic and are not drawn to scale. It should also be understood that the same reference numerals are used throughout the Figures to indicate the same or similar parts.

DETAILED DESCRIPTION

In the context of the present disclosure, where embodiments of the present disclosure constitute a method, it should be understood that such a method may be a process for execution by a computer, i.e., may be a computer-implementable method. The various operations of the method may therefore reflect various parts of a computer program, e.g., various parts of one or more algorithms.

Also, in the context of the present disclosure, a system may be a single device or a collection of distributed devices that are adapted to execute one or more embodiments of the methods of the present disclosure. For instance, a system may be a personal computer (PC), a server, or a collection of PCs and/or servers connected via a network such as a local area network, the Internet, and so on to cooperatively execute at least one embodiment of the methods of the present disclosure.

An issue arises when a program requires the type information of a type but only has access to the metatype associated with that type. Traditional introspection techniques require additional information in order to introspect metatypes, such as utilizing a database for storing information relating to metatypes (i.e., properties and definitions of object class information for use in introspection). This increases the amount of required memory and processing in order to complete the metatype introspection. As a result, the efficiency of the metatype introspection is reduced.

Further, some traditional programming languages do not possess the capability of reflection. An example of such a programming language is Swift. The lack of reflection results in programming languages that are unable to build systems and/or frameworks which require runtime introspection. An example of a traditional type of framework which often relies on reflection is an Object Relational Mapping (ORM). ORM is used for serializing objects to/from relational databases. Such a framework is unable to be simply implemented in a programming language that does not possess the capability of reflection.

Concepts for creating a metatype tree for metatype introspection are presented herein. Such concepts may involve a concept of determining decoding functions used for decoding a metatype based on the properties of the metatype, such that the determined decoding functions are specifically tailored to the metatype. Accordingly, embodiments may facilitate creating a metatype tree for metatype introspection based on decoding the metatype using the determined decoding functions.

Embodiments may be implemented in conjunction with decoding deserializable metatypes. Deserialization (or decoding) refers to taking raw data (e.g., a synthetic dataset) and constructing a data structure or object (e.g., a metatype). The opposite process to deserialization is serialization (or encoding) which refers to converting a data structure or object into raw data (i.e., a sequence of bytes). As such, a metatype needs to be deserializable in order to be decoded. For a metatype to be deserializable, the metatype is required to implement certain functions, which may be specified using an interface or a protocol.

Embodiments of the present disclosure may employ a concept of utilizing a serialization system in a programming language that does not possess the capability of reflection (and consequently introspection). Such a system is referred to as encoding/decoding in Swift. For example, the one or more sets of decoding functions, used to decode the one or more child metatypes, may simulate the decoding process used when decoding a language-independent data format such as JavaScript Object Notation (JSON). The present disclosure is not limited to use with the Swift programming language or the terms encoding and decoding, but rather may be used in any programming language which contains similar functions. As a result, the decoded parent metatype (and consequently the one or more decoded child metatypes) can be intercepted and used to construct a metatype tree representing the information relating to the parent metatype.

A decoding unit (i.e., a decoder) may be provided in some embodiments. Such a decoding unit may be configured to decode a parent metatype from a synthetic dataset by decoding one or more child metatypes of the parent metatype. Traditional decoders construct an object from an encoded data representation such as JSON. During the process, traditional decoders receive information relating to the encoded data representation in order to correctly decode the encoded data representation into an object of a given type. For example, the decoding unit may be further configured to decode a parent metatype from a synthetic dataset by constructing an object of the parent metatype from the synthetic dataset. Further, the decoding unit may be configured to recursively decode the parent metatype. The parent metatype may comprise nested structures, such that the parent metatype comprises one or more child metatypes, and each of the one or more child metatypes may comprise one or more grandchild metatypes. When extracting the parent metatype for complex structures which contain nested structures (i.e., nested metatypes), the decoding unit returns to the parent metatype (i.e., the top level of the complex structure) when decoding the nested structures, in order to consider the parent metatype as a whole. This process is repeated recursively until all of the nested structures of the parent metatype have been decoded, resulting in a decoded parent metatype.

Embodiments of the present disclosure may thus facilitate creating a metatype tree where a parent node comprises the decoded parent metatype (i.e., the metatype given), and one or more child nodes (i.e., leaves) comprises the one or more decoded child metatypes (i.e., the subordinate metatypes to the metatype given). This enables a program to access the internal structure of the parent metatype, thus by definition enabling the program to introspect the parent metatype.

In some embodiments, decoding the one or more child metatypes of the parent metatype may comprise defining one or more metatype functions, then identifying the one or more child metatypes from the synthetic dataset based on the defined metatype functions. This may then comprise determining one or more sets of decoding functions based on the one or more identified child metatypes and decoding the one or more identified child metatypes using the one or more determined sets of decoding functions. In this way, only metatypes that can be decoded (i.e., deserializable metatypes) may be identified. As a result, the risk of attempting to decode (i.e., deserialize) metatypes that are unable to be decoded may be mitigated, which in turn may reduce the risk of creating an error. Further, determining the one or more sets of decoding functions based on the one or more identified child metatypes may optimize the efficiency of decoding the one or more identified child metatypes, as the one or more sets of decoding functions used to decode the one or more identified child metatypes may be specifically tailored to each of the one or more identified child metatypes. Consequently, the efficiency and reliability in creating a metatype tree for metatype introspection may be improved.

In some embodiments, determining the one or more sets of decoding functions based on the one or more identified child metatypes may comprise defining one or more categories. Each of the one or more categories may be associated with a set of decoding functions. The step may further comprise categorizing each of the one or more identified child metatypes using the one or more defined categories and determining the one or more sets of decoding functions based on the one or more categorized child metatypes. In this way, the one or more sets of decoding functions that can be used to decode the one or more child metatypes may be organized by the categories of the one or more child metatypes. As such, each of the one or more sets of decoding functions may be specifically tailored to each of the one or more categories, which may enable the efficiency and reliability of the decoding of the one or more child metatypes to be optimized.

In some embodiments, the one or more categories may comprise at least one of a keyed metatype, an un-keyed metatype, and a single metatype. In this way, the categories may be assigned to the one or more child metatypes based on properties of the one or more child metatypes. This may enable the one or more sets of decoding functions to be determined based on the properties of the one or more child metatypes, thus improving the reliability in determining the one or more sets of decoding functions that are applicable for the corresponding one or more child metatypes. As a result, the efficiency of creating the metatype tree may be increased, as the one or more sets of determined decoding functions may be specifically tailored to the one or more child metatypes to be decoded.

In some embodiments, decoding the one or more child metatypes of the parent metatype may comprise decoding the one or more child metatypes by decoding one or more grandchild metatypes of each of the one or more child metatypes. In this way, recursive decoding of nested structures may be enabled. Nested structures refer to a parent metatype that has one or more associated child metatypes, which in turn have one or more grandchild metatypes associated with each of the one or more child metatypes. Although this embodiment comprises a first level (parent metatype), a second level (one or more child metatypes), and a third level (one or more grandchild metatypes), the present disclosure is not limited to three levels, and may contain additional levels (e.g., a fourth level (one or more great-grandchild metatypes), a fifth level (one or more great-great-grandchild metatypes), etc.) or fewer levels (e.g., only two levels). By decoding the last structure (i.e., the lowest level) when extracting the metatype for complex structures which contain nested structures, the decoding unit (i.e., a decoder) may return to the top level (i.e., the parent metatype) and may consider the parent metatype as a whole. This may enable the internal structure of metatypes comprising complex structures to be accessed and introspected efficiently, without requiring a separate database for storing type information.

In some embodiments, the metatype tree may further comprise one or more grandchild nodes of each of the one or more child nodes. The one or more grandchild nodes may comprise the one or more decoded grandchild metatypes. In this way, the metatype tree may be able to provide organized and complete information relating to a metatype comprising a complex structure. For example, once a nested metatype (e.g., a child metatype and one or more grandchild metatypes of the child metatype) has been decoded, the nested metatype tree may be appended as a metatype leaf in the current decoding metatype tree (i.e., the metatype tree of the parent metatype). The nested metatype trees may continue to be appended as metatype leaves in the metatype tree of the parent metatype until a simple metatype (e.g., an integer type) is reached, at which point the process may stop and the metatype tree of the parent metatype may be completed. This may enable a program to access the internal structure of the metatype, thus enabling the program to introspect the parent metatype.

In some embodiments, decoding the parent metatype from the synthetic dataset may comprise constructing an object of the parent metatype from the synthetic dataset. In this way, the need for an encoded data representation in order to decode the parent metatype may be mitigated. As a result, the metatype tree may be created without the need for an encoded data representation. This may improve the flexibility in creating the metatype tree for metatype introspection.

In some embodiments, the synthetic dataset may comprise one of a simulated dataset and a dummy dataset. In this way, the dataset from which the parent metatype may be decoded may comprise data specific to a context (e.g., testing) or randomly selected data independent of context.

Figure 1:
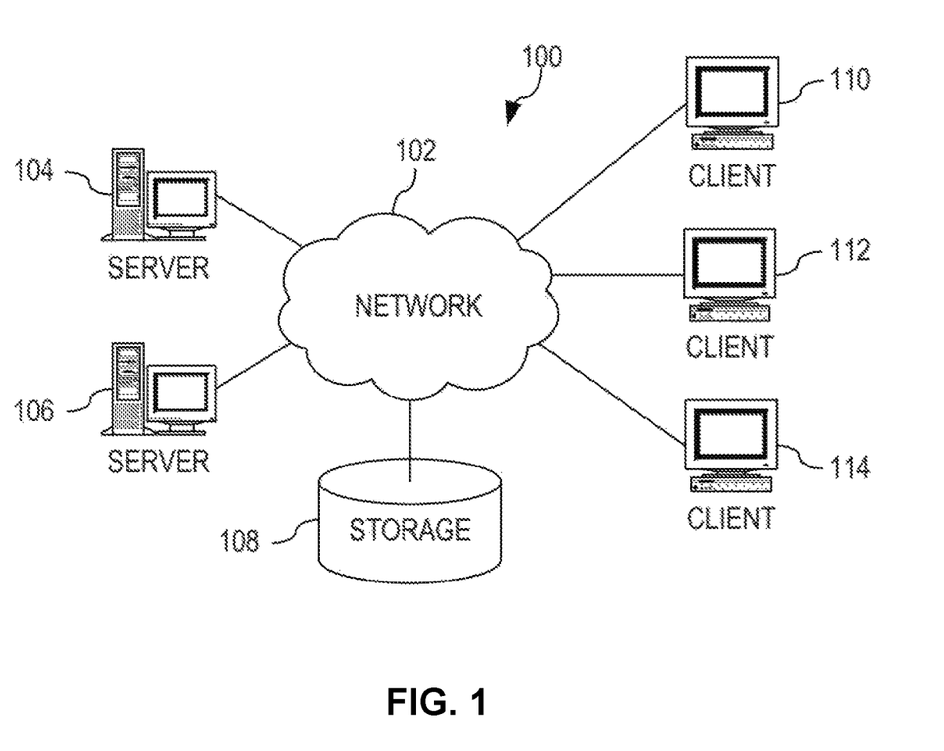
FIG. 1 depicts a pictorial representation of an example distributed system in which aspects of embodiments of the present disclosure may be implemented.

FIG. 1 depicts a pictorial representation of an example distributed system in which aspects of embodiments of the present disclosure may be implemented. Distributed system 100 may include a network of computers in which aspects of embodiments of the present disclosure may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like and are not limited to any particular type of computing device. In the depicted example, the first server 104 provides data, such as boot files, operating system images, and applications to the clients 110, 112, and 114. Clients 110, 112, and 114 are clients to the first server 104 in the depicted example. The distributed processing system 100 may include more or fewer of each of servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
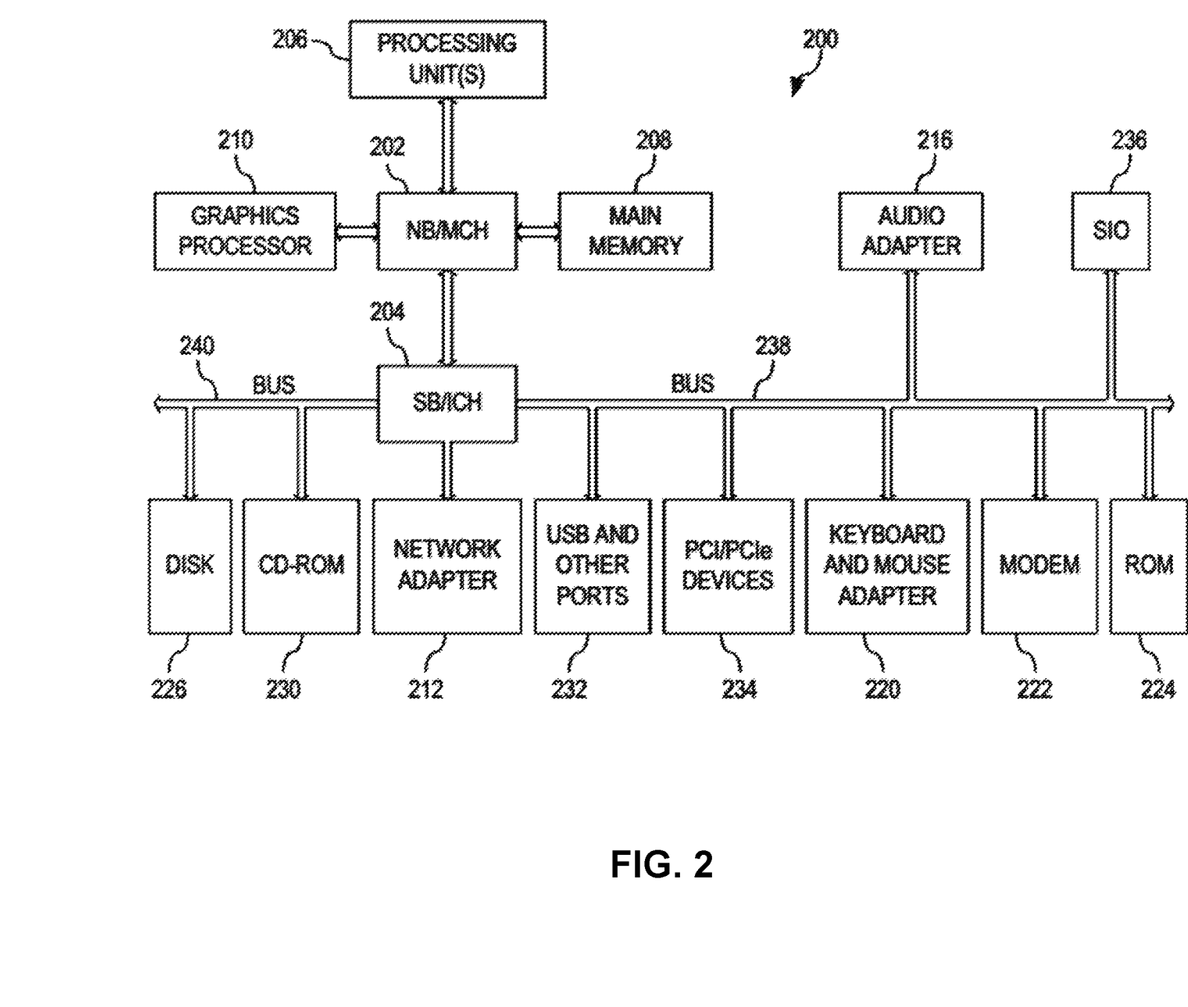
FIG. 2 is a block diagram of an example system in which aspects of embodiments of the present disclosure may be implemented.

FIG. 2 is a block diagram of an example system 200 in which aspects of embodiments of the present disclosure may be implemented. The system 200 is an example of a computer, such as client 110 in FIG. 1, in which computer usable code or instructions implementing the processes for embodiments of the present disclosure may be located.

In the depicted example, the system 200 employs a hub architecture including a north bridge and memory controller hub (NB/MCH) 202 and a south bridge and input/output (I/O) controller hub (SB/ICH) 204. One or more processing units 206, a main memory 208, and a graphics processor 210 are connected to NB/MCH 202. The graphics processor 210 may be connected to the NB/MCH 202 through an accelerated graphics port (AGP).

In the depicted example, a network adapter 212 (which can be e.g., a local area network (LAN) adapter) connects to SB/ICH 204. An audio adapter 216, a keyboard and a mouse adapter 220, a modem 222, a read only memory (ROM) 224, a disk 226 (which can be e.g., a hard disk drive (HDD) or solid state drive (SSD)), a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The disk 226 and CD-ROM drive 230 connect to the SB/ICH 204 through second bus 240. The disk 226 and CD-ROM drive 230 may use, for example, an integrated drive electronics (IDE) or a serial advanced technology attachment (SATA) interface. Super I/O (SIO) device 236 may be connected to SB/ICH 204.

An operating system can be run by the processing unit 206. The operating system coordinates and provides control of various components within the system 200 in FIG. 2. As a client, the operating system of system 200 may be a commercially available operating system. An object-oriented programming system, such as the Java® programming system, may run in conjunction with the operating system and provides calls to the operating system from Java® programs or applications executing on system 200.

As a server, system 200 may be, for a non-limiting example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as disk 226, and may be loaded into main memory 208 for execution by processing unit 206. Similarly, one or more message processing programs according to some embodiments may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
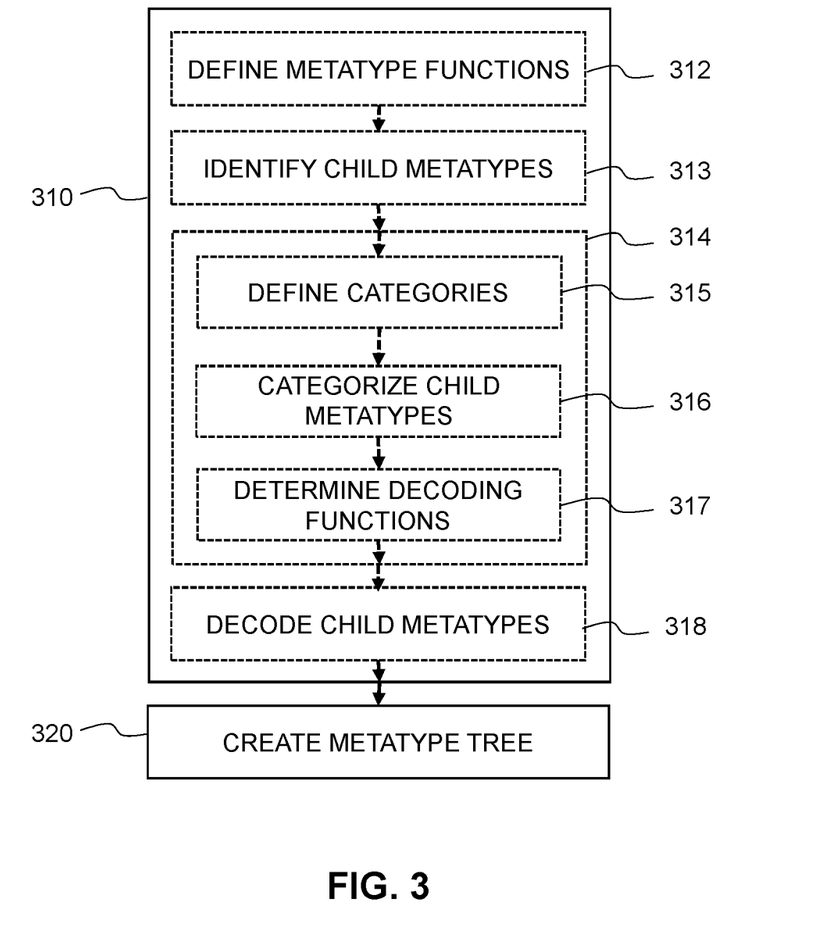
FIG. 3 is a flow diagram of a computer-implemented method for creating a metatype tree for metatype introspection, in accordance with embodiments of the present disclosure.

Referring now to FIG. 3, there is depicted a flow diagram of a computer-implemented method for creating a metatype tree for metatype introspection, in accordance with embodiments of the present disclosure.

Operation 310 comprises decoding a parent metatype from a synthetic dataset by decoding one or more child metatypes of the parent metatype. For example, a deserializable metatype (i.e., a metatype that can be deserialized or decoded) can be introspected using a specially designed decoding unit (i.e., a decoder). Due to a lack of an encoded data representation, the metatype is decoded (i.e., constructed) from a synthetic dataset.

In some embodiments, decoding the parent metatype from the synthetic dataset comprises constructing an object of the parent metatype from the synthetic dataset.

In some embodiments, operation 310 of decoding the one or more child metatypes of the parent metatype comprises additional operations 312, 313, 314, and 318. Operation 312 comprises defining one or more metatype functions. Operation 313 comprises identifying the one or more child metatypes from the synthetic dataset based on the defined metatype functions. In the example established above, the metatypes that can be deserialized (i.e., deserializable metatypes) and the one or more metatype functions (e.g., a shared application programming interface (API) or protocols) are defined (i.e., identified) across types for deserializing. These operations are conducted in order to implement the decoding unit in any programming language. Identifying the deserializable metatypes is achieved using the one or more defined metatype functions. In the case of the Swift language standard protocol "Decodable," there is a requirement that specifies that a metatype is deserializable (i.e., decodable) if it implements an initializer accepting a decoding unit. For instance, such a requirement may be achieved as follows:

```
/// A type that can decode itself from an external representation.
public protocol Decodable {
/// Creates a new instance by decoding from the given decoder.
///
/// This initializer throws an error if reading from the decoder fails, or if the data read is
/// corrupted or otherwise invalid.
///
/// - Parameter decoder: The decoder to read data from.
init(from decoder: Decoder) throws
}
```

Operation 314 comprises determining one or more sets of decoding functions based on the one or more identified child metatypes. For example, the one or more sets of decoding functions can be key functions that the decoding unit requires in order to decode (i.e., deserialize) the one or more identified child metatypes. Operation 318 comprises decoding the one or more identified child metatypes using the one or more determined sets of decoding functions. For example, once the one or more child metatypes (i.e., deserializable metatypes) can be identified and the corresponding one or more sets of decoding functions are determined, the one or more sets of decoding functions (i.e., a decoding process which are used to decode the one or more child metatypes) are implemented.

In some embodiments, determining the one or more sets of decoding functions based on the one or more identified child metatypes comprises operations 315, 316, and 317. Operation 315 comprises defining one or more categories. Each of the one or more categories is associated with a set of decoding functions. Operation 316 comprises categorizing each of the one or more identified child metatypes using the one or more defined categories. Operation 317 comprises determining the one or more sets of decoding functions based on the one or more categorized child metatypes. For example, the identified child metatypes can be categorized depending on their structure to correctly perform the decoding process.

In some embodiments, the one or more categories comprises at least one of a keyed metatype, an un-keyed metatype, and a single metatype. Examples of keyed types include, but are not limited to, objects, classes, dictionaries, and maps. Keyed types contain a key to value relationship enabling a user to access a value by specifying a key. In the case of classes, fields which have a name and a value are used so that the key is the field name. For dictionaries, unique keys are used that are associated with a value. Examples of un-keyed types include, but are not limited to, arrays and sets. Un-keyed types are structures that prevent value extraction using a key. Instead, iteration is required over the values corresponding to the un-keyed types or the value is extracted at a specific index. Single types are types that do not contain nested or un-keyed types. An example of a single type is a raw integer. For example, determining the one or more sets of decoding functions based on the one or more categorized child metatypes is achieved in Swift using a standard set of decoding functions (i.e., a Decoder protocol and the Container protocols) as follows:

```
protocol Decoder {
    func getKeyedContainer( ) -> KeyedContainer
    func getUnKeyedContainer( ) -> UnKeyedContainer
    func getSingleContainer( ) -> SingleContainer
}
```

For example, the KeyedContainer protocol used to decode keyed metatypes is as follows:

```
protocol KeyedContainer {
func decode(type: Integer, key: Key) return Integer ( decoding an integer inside a keyed structure )
func decode(type: String, key: Key) return String ( decoding a String inside a keyed structure )
func decode(type: Decodable, key: Key) return Decodable ( decoding a generic Decodable inside a keyed structure )
}
```

For example, once the one or more sets of decoding functions (e.g., API) have been determined to decode keyed, unkeyed and/or single metatypes, the one or more determined sets of decoding functions (i.e., the one or more sets of decoding function imposed by the Decodable protocol) is implemented. For example, the following represents a metatype:

```
struct Person {
    let name: String
}
```

In order to decode (operation 318) this example metatype, the following set of decoding functions (i.e., 'decode' method) is implemented:

```
extension Person: Decodable {
init(from decoder: Decoder) throws{
let keyedContainer = decoder.getKeyedContainer( )
name = keyedContainer.decode(String.self, key: .name)
}
}
```

In the example, at each call to the determined sets of decoding functions (i.e., the 'decode' method), the metatype is passed to decode (i.e., deserialize) along with the corresponding key, such as in the example above, where 'String.self' is the metatype and '.name' is the key.

Operation 320 comprises creating a metatype tree comprising a parent node and one or more child nodes of the parent node. The parent node comprises the decoded parent metatype and the one or more child nodes of the parent node comprise the one or more decoded child metatypes. In the example, the keys and metatypes are recorded in order to construct the metatype tree containing the type information of the parent metatype being decoded. For instance, a simple metatype tree is as follows:

```
Person {
name: String.self
}
```

In another instance, a complex metatype tree based on a data structure such as a Person having an Address is as follows:

```
struct Address: Decodable {
    let number: Int
    let street: String
    let postcode: String
}
```

```
struct Person: Decodable {
let name: String
let address: Address
}
```

In some embodiments, decoding the one or more child metatypes of the parent metatype comprises decoding the one or more child metatypes by decoding one or more grandchild metatypes of each of the one or more child metatypes.

In some embodiments, the metatype tree further comprises one or more grandchild nodes of each of the one or more child nodes. The one or more grandchild nodes comprises the one or more decoded grandchild metatypes. For example, the following metatype tree is recursively constructed:

```
Person {
name: String.self
address: Address {
number: Int.self
```

```
street: String.self
postcode: String.self
}
}
```

In the example, the one or more determined sets of decoding functions create the metatype tree containing nested structures which are themselves trees due to the recursive nature of the decoding. When decoding nested structures, the top-level containers of each structure are called (e.g., the parent metatype corresponding to one or more child metatypes, or the child metatype corresponding to one or more grandchild metatypes). This returns the metatype tree for that nested structure. The metatype tree is then appended to the current metatype tree (for the parent metatype) as a leaf In this way, the one or more determined sets of decoding functions call themselves recursively to decode (i.e., deserialize) complex structures and append the extracted metatype information to a recursive structure, i.e., a metatype tree.

Examples of representative cases of constructing a recursive enumerated type (also called enumeration or enum) using Swift are as follows:

```
/// Main enum used to describe a decoded type
public indirect enum TypeInfo {
/// Case representing a simple type which is not recursive
///
/// Two types associated with this case: top level and low level
///
/// Example:
/// ```
/// String - single(String.Type, String.Type)
/// URL - single(URL.Type, String.Type)
/// ```
case single(Any.Type, Any.Type)
/// Case representing a struct or a class containing the object type as
/// 'Any.Type' and its nested types as an OrderedDictionary
///
/// Example:
/// ```
/// struct User: Codable {
///     let name: String
///     let age: Int
/// }
/// .keyed(User.Type, ["name": .single(String.Type, String.Type), "age":
.single(Int.Type, Int.Type)]
/// ```
case keyed(Any.Type, OrderedDictionary<String, TypeInfo>)
/// Case representing a Dictionary containing the top level type of the
/// Dictionary, the type of the key and the type of the value
///
/// Example:
/// ```
/// [String: Int] -- .dynamicKeyed(Dictionary<String, Int>.Type,
key:.single(String.Type, String.Type), value: .single(Int.Type, Int.Type))
/// ```
case dynamicKeyed(Any.Type, key: TypeInfo, value: TypeInfo)
/// Case representing an Array containing the top level type of the array
/// and its nested type
///
/// Example:
/// ```
/// [String] -- .unkeyed(Array<String>.Type, .single(String.Type, String.Type))
/// ```
case unkeyed(Any.Type, TypeInfo)
/// Case representing an Optional type containing its nested type
///
/// Example:
/// ```
/// String? -- .optional(.single(String.Type, String.Type))
/// ```
case optional(TypeInfo)
/// Case representing a cyclic type so the associated type is the top level type
```

```
///
/// Example:
/// """
/// struct User: Codable {
/// let name: String
/// let friends: [User]
/// }
/// .keyed(User.Type, ["name": .single(String.Type, String.Type), "friends":
.cyclic(User.Type)]
/// """
case cyclic(Any.Type)
/// Case representing a type that could not be decoded
case opaque(Any.Type)
}
```

Figure 4:
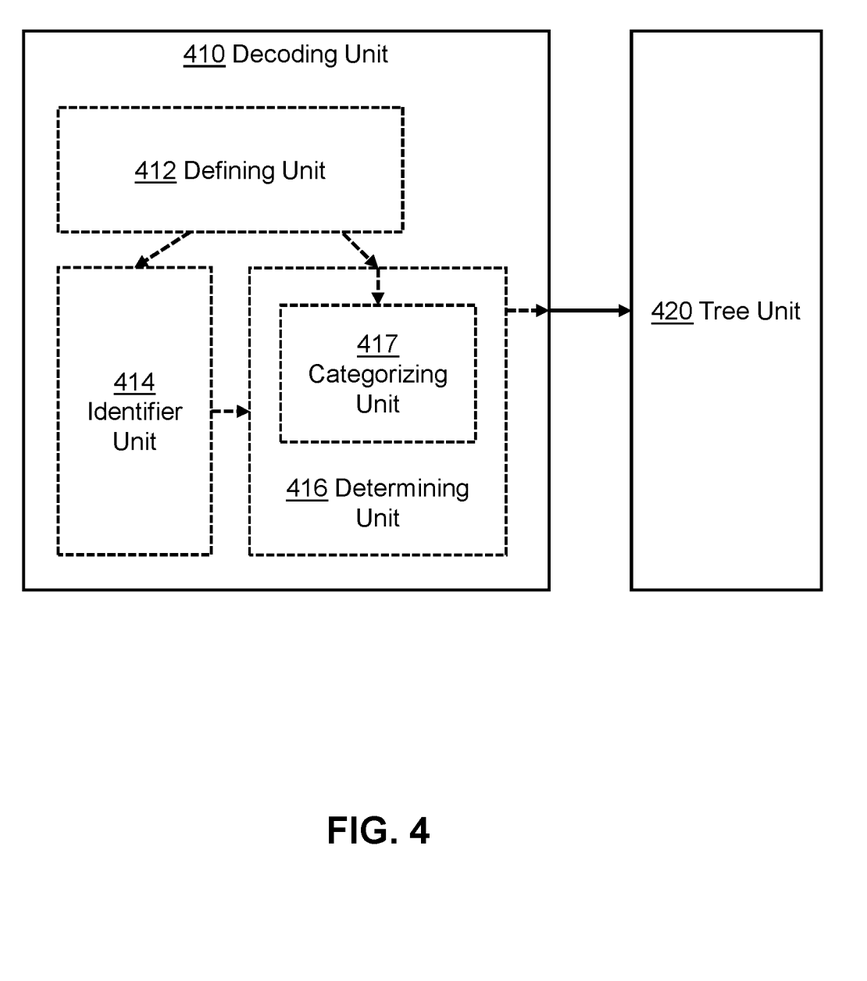
FIG. 4 is a simplified block diagram of an example system for creating a metatype tree for metatype introspection, in accordance with embodiments of the present disclosure.

Referring now to FIG. 4, there is depicted a simplified block diagram of an example embodiment of a system for creating a metatype tree for metatype introspection, in accordance with embodiments of the present disclosure.

The system comprises a decoding unit 410 configured to decode a parent metatype from a synthetic dataset by decoding one or more child metatypes of the parent metatype. The system further comprises a tree unit 420 configured to create a metatype tree comprising a parent node and one or more child nodes of the parent node. The parent node comprises the decoded parent metatype, and the one or more child nodes of the parent node comprise the one or more decoded child metatypes.

In some embodiments, the decoding unit 410 is further configured to decode the one or more child metatypes by decoding one or more grandchild metatypes of each of the one or more child metatypes.

In some embodiments, the metatype tree further comprises one or more grandchild nodes of each of the one or more child nodes. The one or more grandchild nodes comprises the one or more decoded grandchild metatypes.

In some embodiments, the decoding unit 410 is configured to construct an object of the parent metatype from the synthetic dataset.

In some embodiments, the decoding unit 410 comprises a defining unit 412 configured to define one or more metatype functions and an identifier unit 414 configured to identify the one or more child metatypes from the synthetic dataset based on the defined metatype functions. The decoding unit 410 further comprises a determining unit 416 configured to determine one or more sets of decoding functions based on the one or more identified child metatypes, such that the decoding unit 410 is configured to decode the one or more identified child metatypes using the one or more determined sets of decoding functions.

In some embodiments, the defining unit 412 is further configured to define one or more categories. Each of the one or more categories is associated with a set of decoding functions. The determining unit 416 comprises a categorizing unit 417 configured to categorize each of the one or more identified child metatypes using the one or more defined categories, such that the determining unit 416 is further configured to determine the one or more sets of decoding functions based on the one or more categorized child metatypes.

In some embodiments, the one or more categories comprise at least one of a keyed metatype, an un-keyed metatype, and a single metatype.

In some embodiments, the synthetic dataset comprises one of a simulated dataset and a dummy dataset.

Figure 5:
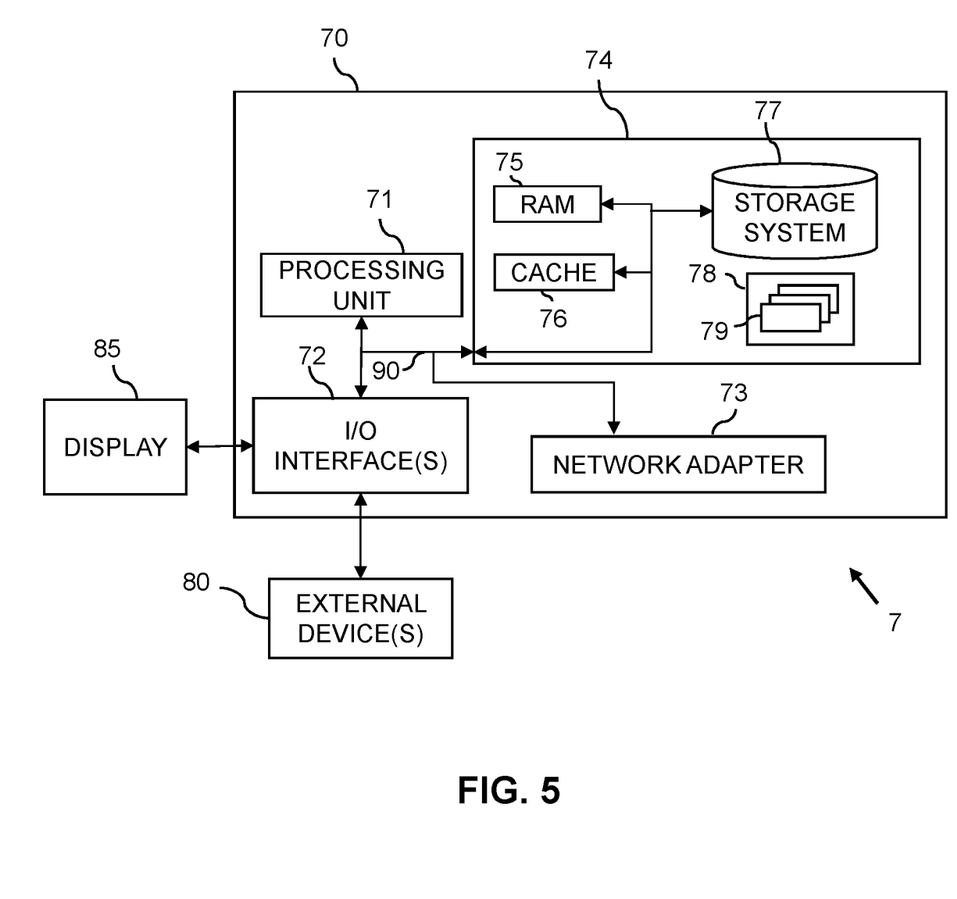
FIG. 5 is a simplified block diagram of an example system for creating a metatype tree for metatype introspection, in accordance with embodiments of the present disclosure.

By way of further example, as illustrated in FIG. 5, embodiments may comprise a computer system 70, which may form part of a networked system 7. The components of computer system/server 70 may include, but are not limited to, one or more processing arrangements, for example comprising processors or processing unit 71, a system memory 74, and a bus 90 that couples various system components including system memory 74 to processing unit 71.

The processing unit 71 is configured to define a target object type; the target object type is adapted to hold results of a middleware function. Further, the processing unit 71 is configured to receive a first object for an application, then perform a process of the middleware function using the first object to generate a process result. Based on the process result, the processing unit 71 is configured to generate a second object of the target object type, and provide the second object to the application.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 77 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the present disclosure.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the present disclosure as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interface(s) 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method is a process for execution by a computer, i.e., is a computer-implementable method. The various operations of the method therefore reflect various parts of a computer program, e.g., various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one operation, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A computer-implemented method for creating a metatype tree for metatype introspection, the method comprising:
    decoding a parent metatype from a synthetic dataset by decoding one or more child metatypes of the parent metatype; and
    creating a metatype tree comprising:
        a parent node comprising the decoded parent metatype; and
        one or more child nodes of the parent node comprising the one or more decoded child metatypes.

2. The method of claim 1, wherein decoding the one or more child metatypes of the parent metatype comprises decoding the one or more child metatypes by decoding one or more grandchild metatypes of a plurality of the one or more child metatypes.

3. The method of claim 2, wherein the metatype tree further comprises one or more grandchild nodes of a plurality of the one or more child nodes, wherein the one or more grandchild nodes comprises the one or more decoded grandchild metatypes.

4. The method of claim 1, wherein decoding the parent metatype from the synthetic dataset comprises constructing an object of the parent metatype from the synthetic dataset.

5. The method of claim 1, wherein decoding the one or more child metatypes of the parent metatype comprises:
    defining one or more metatype functions;
    identifying the one or more child metatypes from the synthetic dataset based on the defined metatype functions;
    determining one or more sets of decoding functions based on the one or more identified child metatypes; and
    decoding the one or more identified child metatypes using the one or more determined sets of decoding functions.

6. The method of claim 5, wherein determining the one or more sets of decoding functions based on the one or more identified child metatypes comprises:
    defining one or more categories, wherein each of the one or more categories is associated with a set of decoding functions;
    categorizing each of the one or more identified child metatypes using the one or more defined categories; and
    determining the one or more sets of decoding functions based on the one or more categorized child metatypes.

7. The method of claim 6, wherein the one or more categories comprises at least one of a keyed metatype, an un-keyed metatype, and a single metatype.

8. The method of claim 1, wherein the synthetic dataset is selected from the group consisting of a simulated dataset and a dummy dataset.

9. A computer program product for creating a metatype tree for metatype introspection, the computer program product comprising a computer readable storage medium having program instructions embodied therewith, the program instructions executable by a processing unit to cause the processing unit to perform a method comprising:

decoding a parent metatype from a synthetic dataset by decoding one or more child metatypes of the parent metatype; and creating a metatype tree comprising:
a parent node comprising the decoded parent metatype; and
one or more child nodes of the parent node comprising the one or more decoded child metatypes.

10. The computer program product of claim 9, wherein decoding the one or more child metatypes of the parent metatype comprises decoding the one or more child metatypes by decoding one or more grandchild metatypes of a plurality of the one or more child metatypes.

11. The computer program product of claim 9, wherein decoding the one or more child metatypes of the parent metatype comprises:
defining one or more metatype functions;
identifying the one or more child metatypes from the synthetic dataset based on the defined metatype functions;
determining one or more sets of decoding functions based on the one or more identified child metatypes; and
decoding the one or more identified child metatypes using the one or more determined sets of decoding functions.

12. The computer program product of claim 11, wherein determining the one or more sets of decoding functions based on the one or more identified child metatypes comprises:
defining one or more categories, wherein each of the one or more categories is associated with a set of decoding functions;
categorizing each of the one or more identified child metatypes using the one or more defined categories; and
determining the one or more sets of decoding functions based on the one or more categorized child metatypes.

13. A system for creating a metatype tree for metatype introspection, the system comprising:
one or more processors; and
a memory communicatively coupled to the one or more processors,
wherein the memory comprises instructions which, when executed by the one or more processors, cause the one or more processors to perform a method comprising:
decoding a parent metatype from a synthetic dataset by decoding one or more child metatypes of the parent metatype; and
creating a metatype tree comprising:
a parent node comprising the decoded parent metatype; and
one or more child nodes of the parent node comprising the one or more decoded child metatypes.

14. The system of claim 13, wherein decoding the one or more child metatypes of the parent metatype comprises decoding the one or more child metatypes by decoding one or more grandchild metatypes of a plurality of the one or more child metatypes.

15. The system of claim 14, wherein the metatype tree further comprises one or more grandchild nodes of a plurality of the one or more child nodes, wherein the one or more grandchild nodes comprises the one or more decoded grandchild metatypes.

16. The system of claim 13, wherein decoding the parent metatype from the synthetic dataset comprises constructing an object of the parent metatype from the synthetic dataset.

17. The system of claim 13, wherein decoding the one or more child metatypes of the parent metatype comprises:
defining one or more metatype functions;
identifying the one or more child metatypes from the synthetic dataset based on the defined metatype functions;
determining one or more sets of decoding functions based on the one or more identified child metatypes; and
decoding the one or more identified child metatypes using the one or more determined sets of decoding functions.

18. The system of claim 17, wherein determining the one or more sets of decoding functions based on the one or more identified child metatypes comprises:
defining one or more categories, wherein each of the one or more categories is associated with a set of decoding functions;
categorizing each of the one or more identified child metatypes using the one or more defined categories; and
determining the one or more sets of decoding functions based on the one or more categorized child metatypes.

19. The system of claim 18, wherein the one or more categories comprises at least one of a keyed metatype, an un-keyed metatype, and a single metatype.

20. The system of claim 13, wherein the synthetic dataset is selected from the group consisting of a simulated dataset and a dummy dataset.

* * * * *